United States Patent
Flores Corona et al.

(10) Patent No.: US 10,844,817 B2
(45) Date of Patent: Nov. 24, 2020

(54) CONVOLUTE-SWIRL INTEGRATED DUCT FOR SWIRL GENERATION

(71) Applicant: Ford Global Technologies, LLC, Dearborn, MI (US)

(72) Inventors: Jorge Flores Corona, Naucalpan (MX); Daniel Hernandez, Coacalco (MX); Shrevatsan Venkatesan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/274,098

(22) Filed: Feb. 12, 2019

(65) Prior Publication Data

US 2019/0323460 A1    Oct. 24, 2019

Related U.S. Application Data

(60) Provisional application No. 62/661,416, filed on Apr. 23, 2018.

(51) Int. Cl.
*F02M 35/10* (2006.01)

(52) U.S. Cl.
CPC .......... *F02M 35/10118* (2013.01); *F02M 35/10124* (2013.01)

(58) Field of Classification Search
CPC ....... F02M 35/10118; F02M 35/10124; F02M 35/10137; F02M 35/10157; F02M 35/10262; F02M 35/10321; F04D 29/4213
See application file for complete search history.

(56) References Cited

U.S. PATENT DOCUMENTS

| | | | | |
|---|---|---|---|---|
| 1,971,595 A | * | 8/1934 | Booth | F16L 11/15 138/128 |
| 1,993,965 A | * | 3/1935 | Huck | F16L 11/15 138/128 |
| 2,622,623 A | * | 12/1952 | Michaudet | F16L 11/115 138/122 |
| 2,945,483 A | * | 7/1960 | Howell | F02N 99/006 123/179.8 |
| 3,318,335 A | * | 5/1967 | Heller | F16L 51/025 138/121 |
| 4,864,859 A | * | 9/1989 | Jensen | F01D 5/027 73/473 |
| 5,397,157 A | * | 3/1995 | Hempel | F02M 35/10137 277/616 |

(Continued)

FOREIGN PATENT DOCUMENTS

| | | |
|---|---|---|
| DE | 102005019896 A1 | 11/2006 |
| DE | 102008046220 A1 | 3/2010 |

(Continued)

*Primary Examiner* — George C Jin
*Assistant Examiner* — Teuta B Holbrook
(74) *Attorney, Agent, or Firm* — Geoffrey Brumbaugh; McCoy Russell LLP

(57) ABSTRACT

Methods and systems are provided for a convolute-swirl integrated duct (CSID). In one example the CSID may be configured to comply with engine roll and induce swirl in an intake air flow. Engine roll is absorbed as a result of a positioning of the CSID along an intake passage upstream of a compressor inlet and pre-whirl is introduced to intake air prior to delivery of the intake air to a compressor.

20 Claims, 9 Drawing Sheets

(56) References Cited

U.S. PATENT DOCUMENTS

| | | | | |
|---|---|---|---|---|
| 6,123,113 | A * | 9/2000 | Pontbriand | F16L 11/11 138/119 |
| 6,315,332 | B1 * | 11/2001 | Aschoff | F01N 13/1816 285/226 |
| 6,461,695 | B1 * | 10/2002 | Schaap | B29C 70/205 156/192 |
| 7,163,029 | B2 | 1/2007 | Koenen | |
| 7,398,798 | B2 | 7/2008 | Ostan et al. | |
| 8,327,975 | B2 * | 12/2012 | Ortman | F02B 33/44 123/184.53 |
| 8,651,800 | B2 | 2/2014 | Li | |
| 9,010,111 | B2 | 4/2015 | Wittler | |
| 9,897,052 | B2 | 2/2018 | Natali et al. | |
| 2002/0121271 | A1 * | 9/2002 | Araujo | F02B 33/34 123/565 |
| 2003/0035095 | A1 * | 2/2003 | Phillips | G03B 17/045 355/72 |
| 2006/0125149 | A1 * | 6/2006 | Takada | B29C 45/435 264/328.2 |
| 2006/0218919 | A1 * | 10/2006 | Mitani | F02G 1/02 60/519 |
| 2007/0175533 | A1 | 8/2007 | Herron, Jr. et al. | |
| 2007/0240393 | A1 * | 10/2007 | Dworatzek | F02M 35/10321 55/495 |
| 2008/0035097 | A1 * | 2/2008 | Onishi | F02M 35/10144 123/195 A |
| 2009/0139228 | A1 * | 6/2009 | Talmon-Gros | F02B 37/225 60/600 |
| 2009/0188461 | A1 * | 7/2009 | Kummermehr | F02B 25/14 123/184.52 |
| 2010/0108170 | A1 * | 5/2010 | Chudkosky | B29C 53/60 138/122 |
| 2010/0192891 | A1 * | 8/2010 | Catton | F02M 35/10098 123/184.21 |
| 2011/0011355 | A1 * | 1/2011 | De la Hunt | F01N 13/10 123/41.05 |
| 2012/0222643 | A1 | 9/2012 | Jasnie et al. | |
| 2013/0092472 | A1 * | 4/2013 | Ostler | F02M 35/1216 181/256 |
| 2017/0342895 | A1 * | 11/2017 | Niwa | F02B 37/004 |
| 2018/0030876 | A1 * | 2/2018 | Miyoshi | F02M 26/15 |
| 2018/0187592 | A1 * | 7/2018 | Bardakjy | F02B 33/44 |
| 2018/0320801 | A1 * | 11/2018 | Yang | B23P 15/00 |
| 2019/0301353 | A1 * | 10/2019 | Grebien | F02B 37/00 |

FOREIGN PATENT DOCUMENTS

| | | | |
|---|---|---|---|
| FR | 2950105 A1 | 3/2011 | |
| FR | 2987873 * | 9/2013 | F02M 35/10 |
| JP | 60053274 A * | 3/1985 | F16J 3/047 |
| RU | 2141137 C1 * | 11/1999 | |
| WO | WO-2008009789 A1 * | 1/2008 | F02M 35/10222 |

* cited by examiner

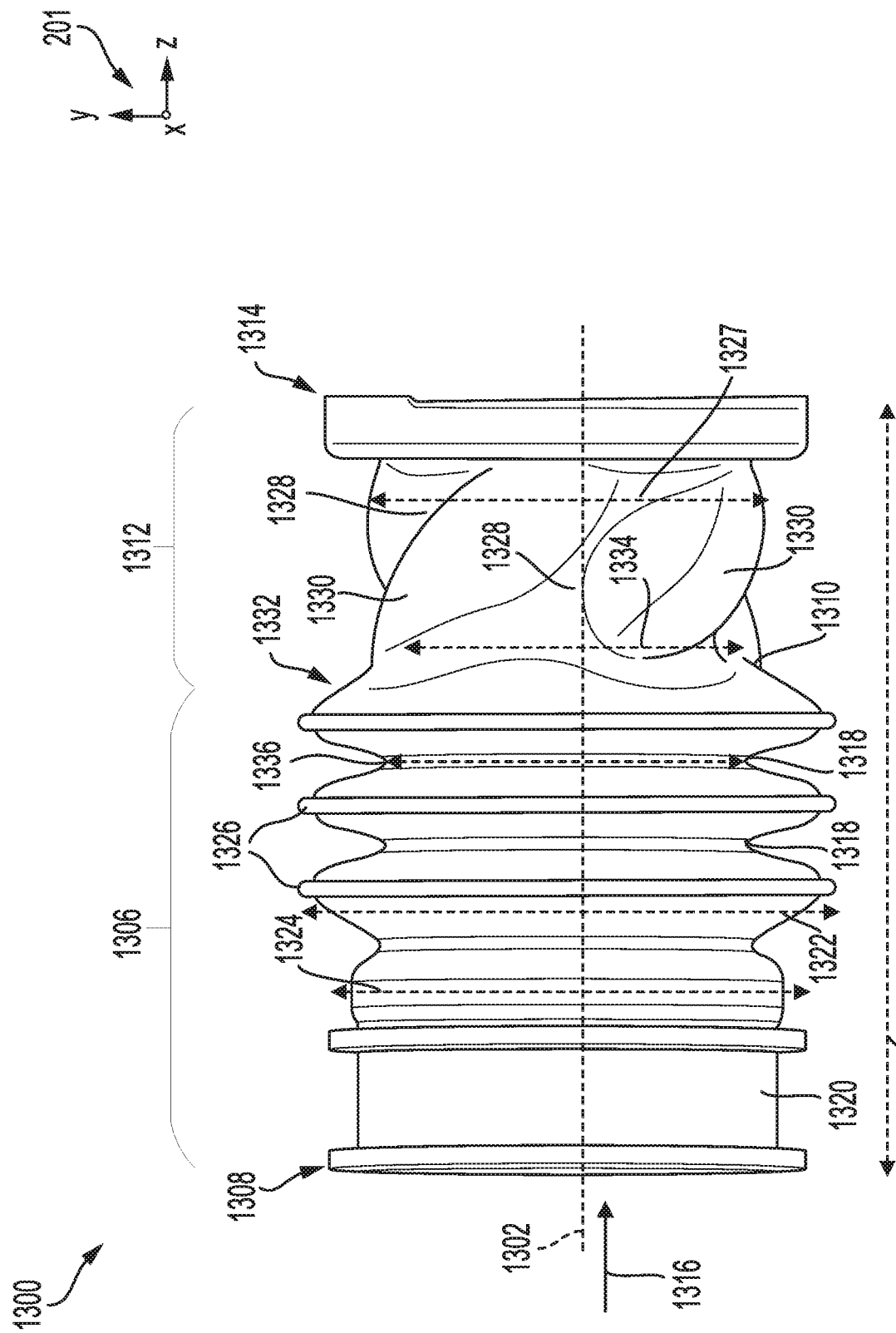

CONVOLUTE-SWIRL INTEGRATED DUCT FOR SWIRL GENERATION

CROSS REFERENCE TO RELATED APPLICATION

The present application claims priority to U.S. Provisional Application No. 62/661,416, entitled "CONVOLUTE-SWIRL INTEGRATED DUCT FOR SWIRL GENERATION" and filed on Apr. 23, 2018. The entire contents of the above-listed application are hereby incorporated by reference for all purposes.

FIELD

The present description relates generally to a device for swirling intake air and absorbing engine roll.

BACKGROUND/SUMMARY

Vehicles configured with gas turbocharger direct injection (GTDI) engines include compressors, driven by mechanical coupling to a turbine, to deliver boosted air to an engine's combustion chambers, thereby increasing power output and improving fuel efficiency. However, if air entering the compressor is not rotating in a similar direction as the compressor impeller, compressor instability may occur. In addition, the compressor may experience aerodynamic losses and rotating stall, and vehicle noise, vibration, and harshness (NVH) issues may ensue.

One approach to address the issues described includes configuring an air induction system of the engine with a swirl vane device, arranged upstream of the compressor. In an example approach shown by Eisterlehner et al. in DE 10 2005 019 896, a spin production device may be coupled to a compressor housing. The device has deformable elastic vanes coupled to a ring-shaped actuating portion. An amount of swirl imparted to intake air may be controlled by adjustment of the actuating portion via connection of the actuating portion to a drive mechanism that may adjust swirl based on inputs such as engine speed, turbocharger speed, exhaust gas pressure, etc. The vanes extend into the flow of intake air and curve in a radial direction, interacting with the intake to rotate air flow in a desired direction.

However, the inventors herein have recognized potential issues with such systems. As one example, the insertion and removal of the swirl vane device into the intake passage or compressor inlet may be performed by a specialized tool and coupling of the device to the intake passage and/or to the inlet of the compressor may require additional assembly components, thereby incurring additional costs and complexity to the air induction system. Furthermore, the device may impose a restriction on flow through the intake passage, reducing a boost pressure provided by the compressor and adding weight to the air induction system.

In one example, the issues described above may be addressed by a flexible conduit in a vehicle, comprising a first end and a second end, the second end downstream of the first end, each of the first and the second ends configured to couple to sections of an intake passage of an engine of the vehicle, and a plurality of threads spiraling around a circumference of the conduit and partially extending from the first end to the second end. The flexible conduit may be a convolute-swirl integrated duct (CSID) formed from flexible materials that allows the CSID to couple sections of the intake passage that may not be linearly aligned while absorbing vibrational motion transmitted to the intake passage from the moving engine. Furthermore the CSID may influence air flow to a compressor inlet.

As one example, the CSID is similarly shaped as the conventional convolute but includes spiraling threads protruding inwards along a length of the CSID. The threads guide air flow, similar to the guide vanes of the swirl vane device, to swirl in a direction according to a direction that the threads wind around the CSID. Dimensions and a geometry of the CSID, such as a diameter, the length, a pitch and a depth of the threads, may be adjusted to achieve a desired amount of swirl and flow rate of intake air through the CSID before engaging with the compressor impeller. In this way, pre-whirl is generated and engine roll is absorbed by a single device without adding more components, increasing a complexity of the air induction system, or restricting flow rates through an intake passage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 13 shows a fourth embodiment of a CSID.

FIGS. 2-5, 7, 9-10, and 12-13 are shown to scale although other relative dimensions may be used, if desired.

DETAILED DESCRIPTION

Figure 1:
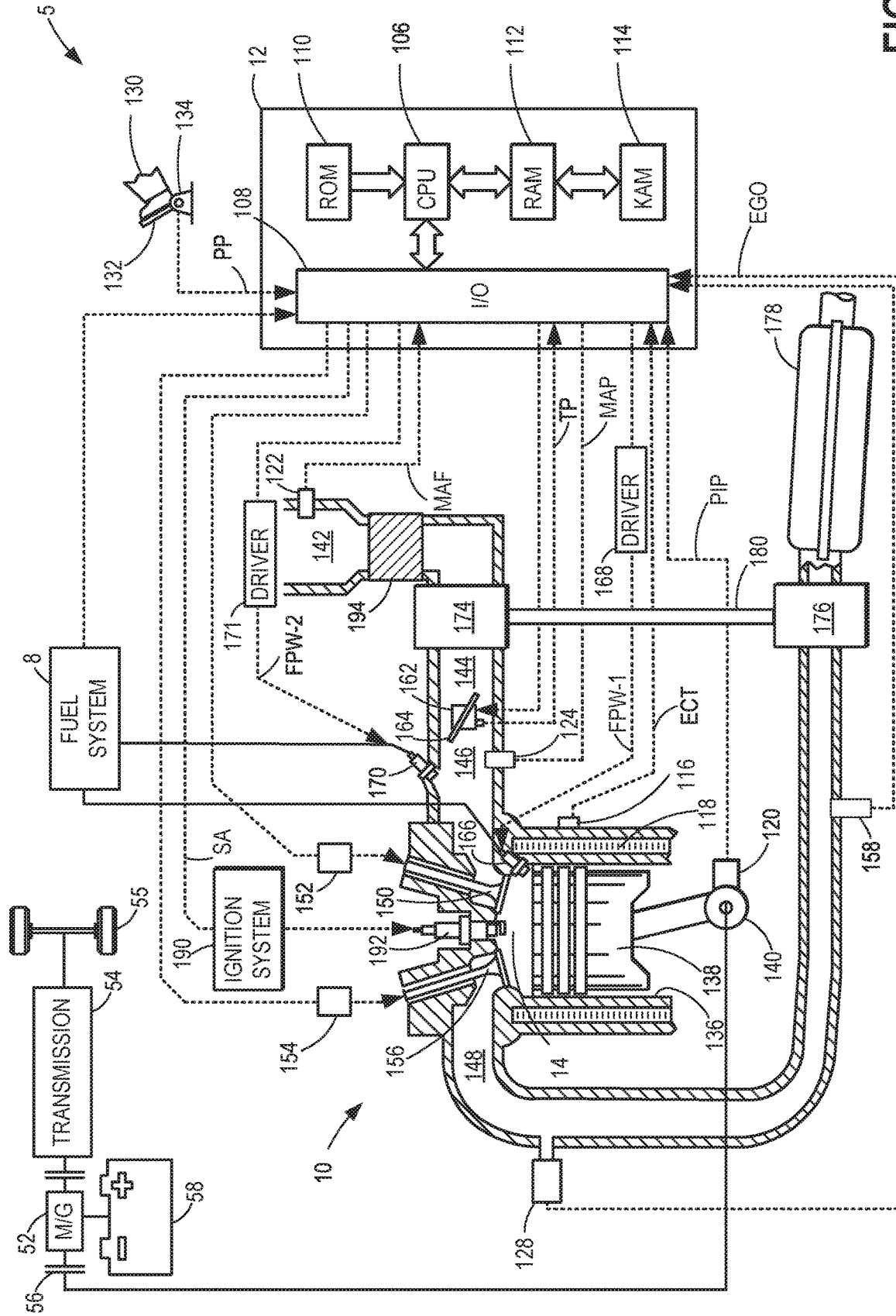
FIG. 1 shows an example of an engine system adapted with a convolute-swirl integrated duct (CSID).
Figure 2:
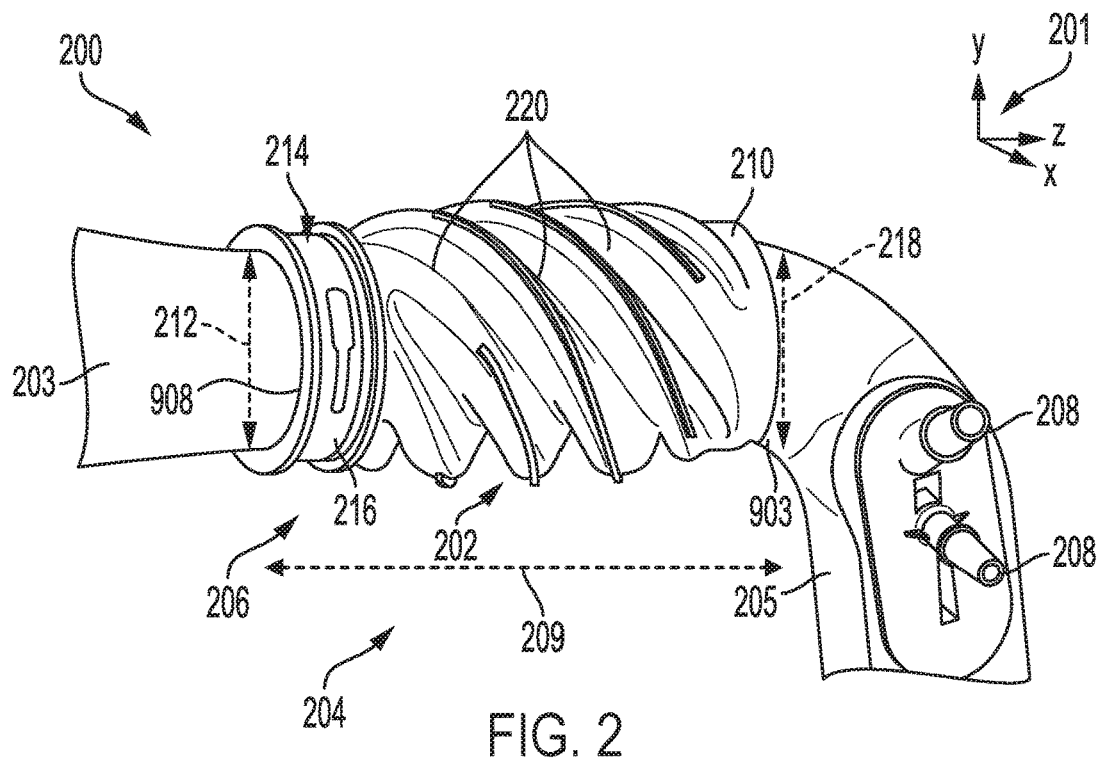
FIG. 2 shows an example of an air induction system with a first embodiment of a CSID arranged inline in an intake passage.
Figure 3:
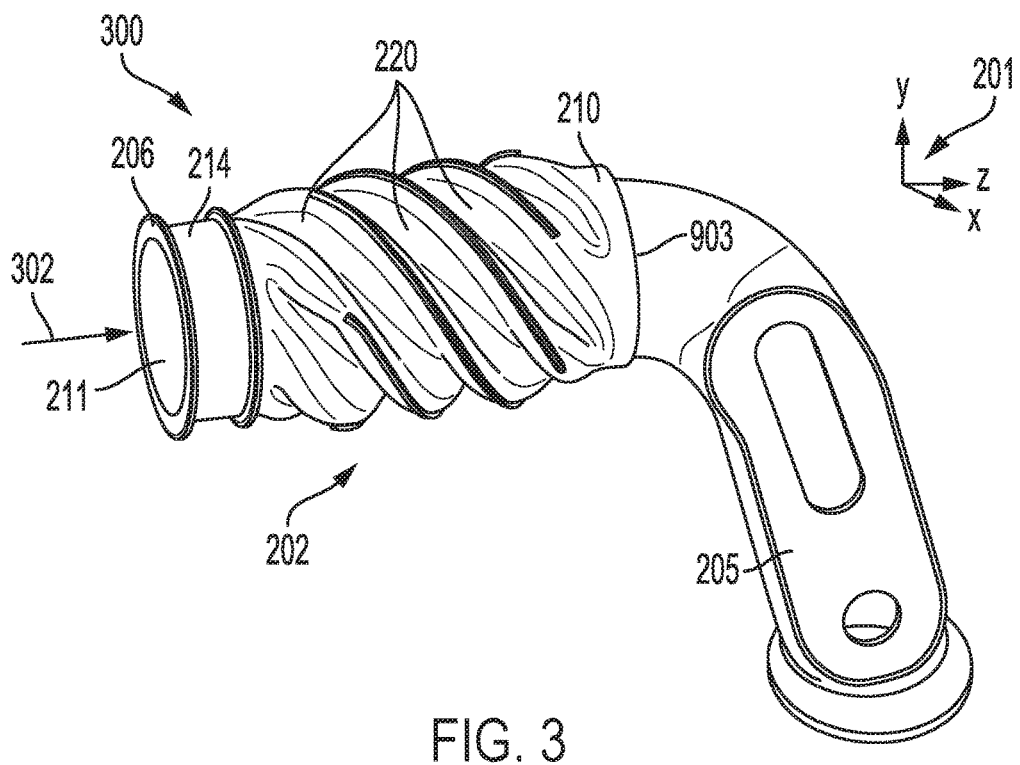
FIG. 3 shows the CSID of FIG. 2 detached from the air induction system at an upstream end and attached at a downstream end to an intake passage.
Figure 4:
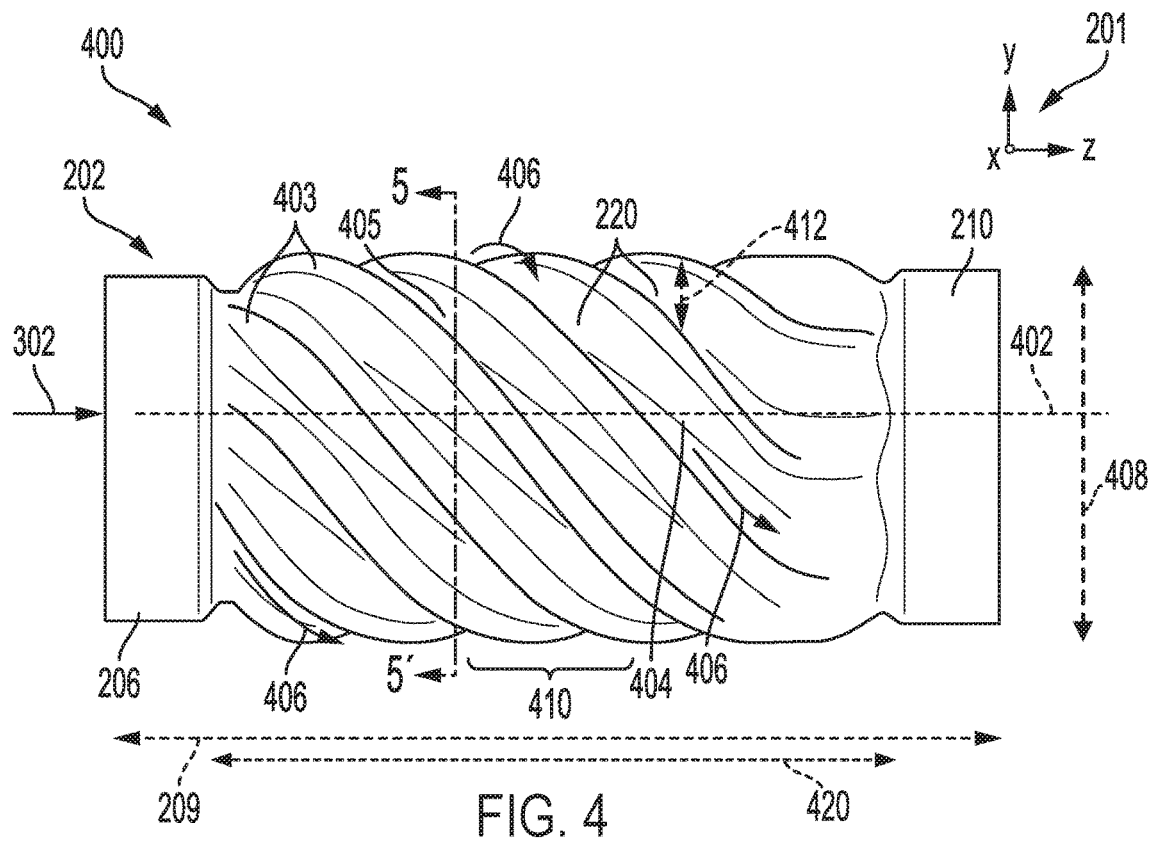
FIG. 4 shows a side view of the CSID of FIGS. 2 and 3.
Figure 7:
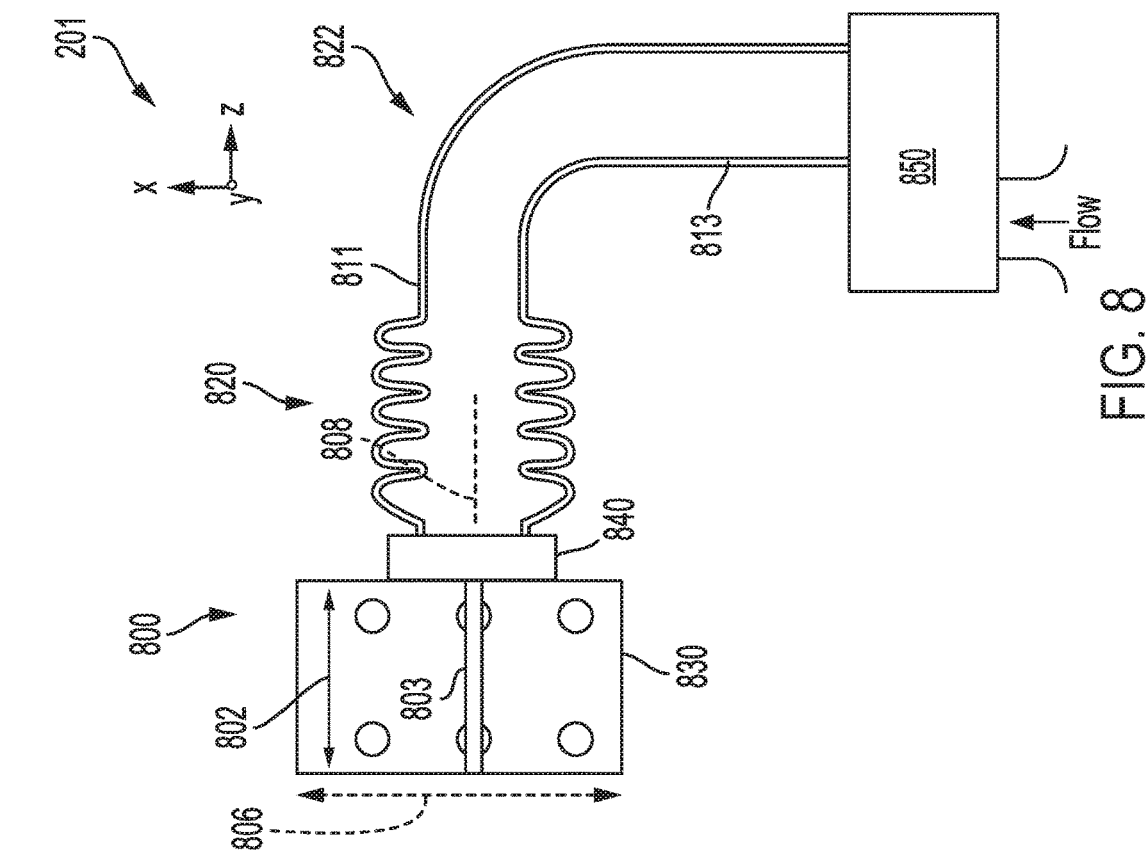
FIG. 7 shows a first schematic diagram of an engine system illustrating a first position of a CSID relative to a first orientation of an engine.
Figure 8:
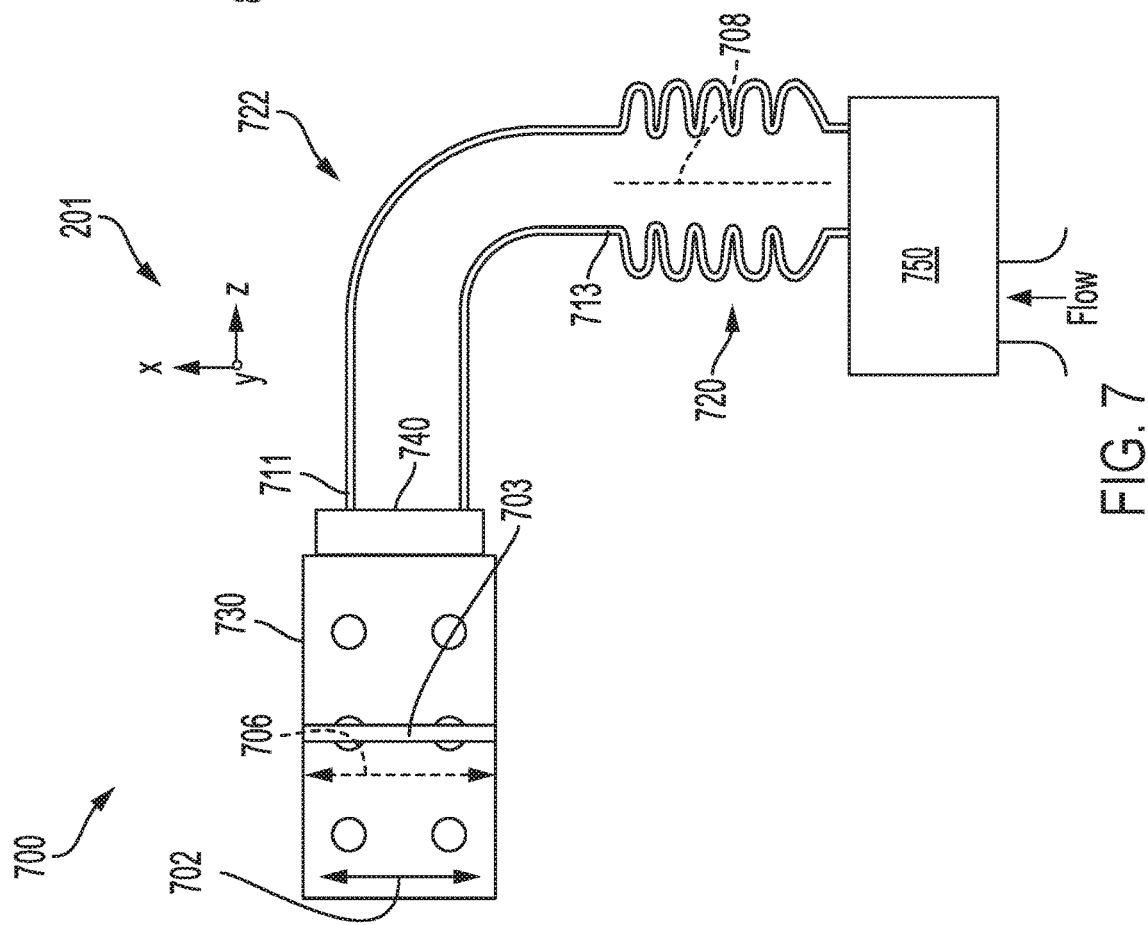
FIG. 8 shows a second schematic diagram of an engine system illustrating a second position of a CSID relative to a second orientation of an engine.
Figure 9:
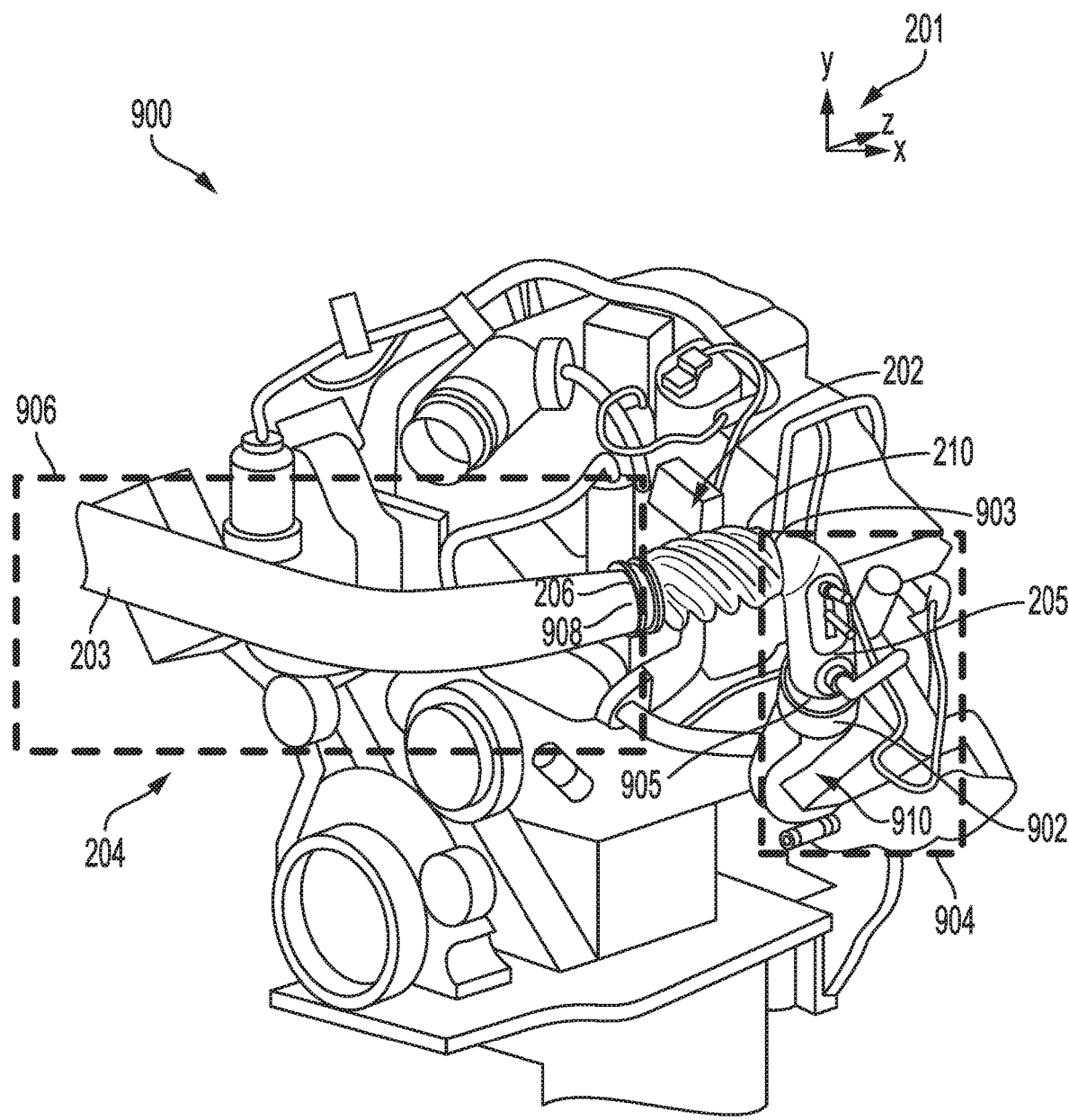
FIG. 9 shows an example embodiment of an engine system with an intake passage including the CSID of FIGS. 2-5.
Figure 10:
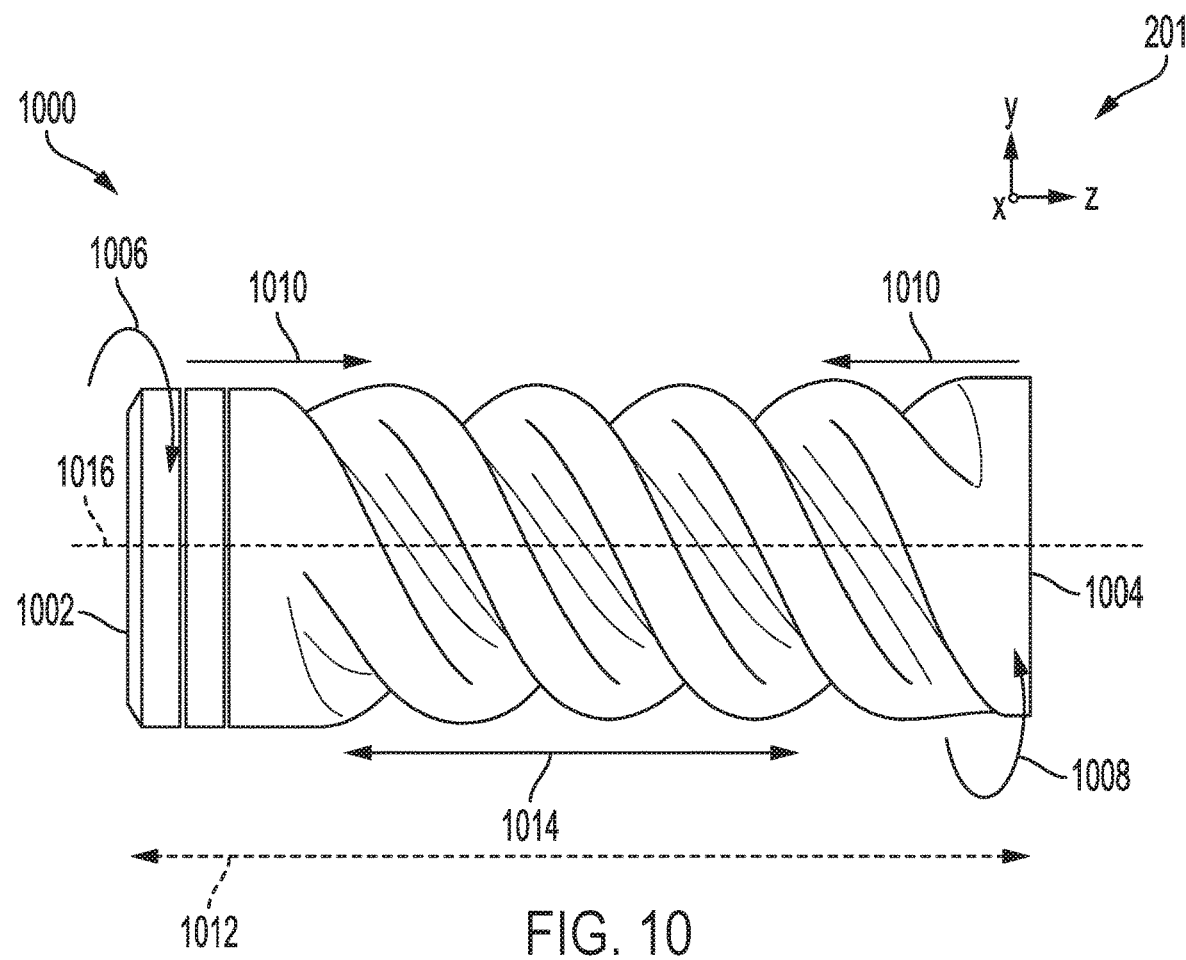
FIG. 10 shows a second embodiment of a CSID, illustrating a twisting motion of the CSID.
Figure 11:
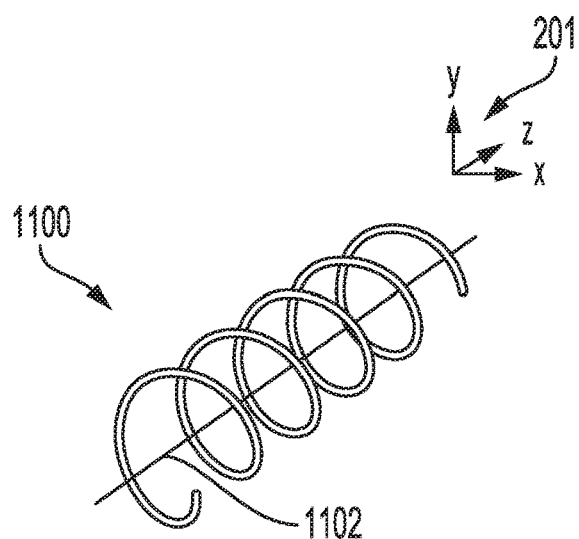
FIG. 11 shows a helix that may represent a shape of threads of a CSID.
Figure 12:
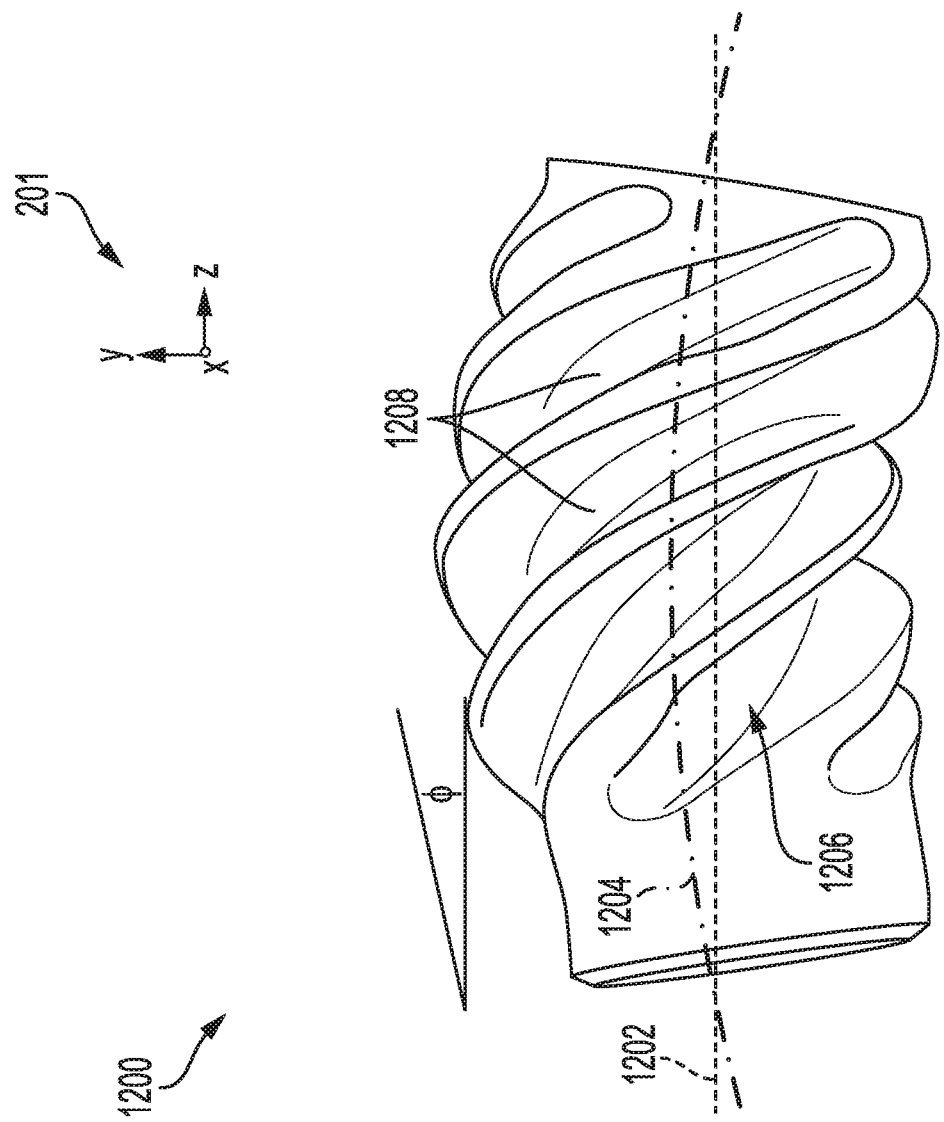
FIG. 12 shows a third embodiment of a CSID, depicting a bending capacity of the CSID.

The following description relates to a convolute-swirl integrated duct (CSID) configured to generate pre-swirl in intake air, upstream of a compressor, and absorb engine roll. The device may be arranged in an intake passage of an engine system. An example of an engine system with a first embodiment of a CSID positioned in an intake passage, upstream of a compressor and an engine, is shown in FIG. 1. The CSID may be arranged in line with the intake passage so that air flowing through an air induction system of the engine system also flows through the CSID, as shown in FIGS. 2 and 3. The CSID may include inwardly protruding spiral threads that induce swirl in air flow without adversely affecting flow rates. A detailed side view of the CSID is depicted in FIG. 4, showing a geometry of the threads. An inner geometry of the CSID is shown in a cross-section in FIG. 5. Schematic diagrams of a representative cylinder and cross-section of the cylinder are given in FIG. 6 to illustrate parameters used to calculate a swirl ratio as well as a mean pre-whirl ratio, which may be used to determine an effect of the CSID on air travelling through the CSID. Schematic diagrams of an engine system are shown in FIGS. 7 and 8, showing a first and second position of a CSID, respectively, based on a first and second orientation, respectively, of an engine. A position of the CSID shown in FIGS. 2-5, arranged in an intake passage and coupled to an engine via a compressor inlet, is illustrated in FIG. 9. An alternate embodiment of a CSID is shown in FIG. 10, depicting a twisting motion imposed on the CSID due to absorption of engine roll. A helix is shown in FIG. 11, representing a shape of convolutes, or threads, of the CSID that spiral around a circumference of the CSID. In FIG. 12, another example of a CSID is shown, depicted with a bent configuration, where bending of the CSID may affect an amount of swirl imparted to intake air. A fourth example of the CSID is shown in FIG. 13, that is divided between a first portion that acts as a convolute and a second portion that acts as a swirl-inducer. Further, as described herein, elements of the various embodiments may be combined together, such as illustrated in FIG. 13 itself, confirming the embodiments are usable together, if desired.

FIGS. 1-5, 7-10, and 12-13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, an example of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A convolute-swirl integrated duct (CSID) 194 may be arranged in line with intake air passage 142, forming a section of the intake air passage 142. The CSID 194 may be positioned between an inlet of the intake air passage 142 and compressor 174 and adapted to swirl air flowing into the compressor inlet to match a rotational direction of an impeller of the compressor 174. In addition, the CSID 194 may absorb engine roll. A geometry of the CSID 194, including inwardly spiraling ribs, threads, or convolutes may be adjusted to accommodate a severity of motion propagating through the intake air passage 142 and affect rotation of air flowing to the compressor 174. Further details of the CSID 194 will be elaborated below with respect to FIGS. 2-12.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus.

Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, upon receiving a signal from the input device 132 that an accelerator pedal tip-in is occurring, the engine controller may command adjustments to increase boost pressure (e.g., pressure of compressed air delivered from the compressor outlet to the combustion chambers). A valve of an exhaust wastegate (not shown in FIG. 1), coupling the exhaust passage 148 upstream of the turbine 176 to a region of the exhaust passage 148 downstream of the turbine 176 and upstream of the emission control device 178, may be closed. Exhaust gas may be channeled exclusively to the turbine 176 to increase a rotational speed of the turbine 176, thereby increasing compressor speed and boost pressure. Alternatively, a supercharger, if present, may be used to spin-up the compressor rapidly to achieve a desired boost pressure.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The reception of boosted air at the cylinders of the engine from the turbocharger compressor, such as compressor 174 of FIG. 1, may improve a power output and fuel efficiency of an engine system. Such benefits provided by the turbocharger, however, may be dependent on an operational efficiency of the compressor. Compressor efficiency may be affected by an interaction of the impeller blades with intake air flow. For example, if intake air entering the compressor inlet is swirling in an opposite direction relative to the spin of the impeller, the opposing rotational directions may cause compressor instability, aerodynamic losses, and rotating stall. By incorporating a device to swirl air in a same direction as the rotational direction of the impeller before entering the compressor inlet, compressor operation may be stabilized and compressor efficiency improved.

Pre-swirling intake air upstream of the compressor may be achieved by configuring the intake passage, such as intake passage 142 of FIG. 1, with a convolute-swirl integrated duct (CSID). The CSID may be a conduit positioned in the intake passage to absorb engine roll and accommodate bends and turns in the intake passage, similar to a conventional convolute. In addition, the CSID is configured with a geometry that controls a rotation of air flowing through the CSID, upstream of the compressor inlet, without restricting air flow to the compressor inlet. Thus, when included in an air induction system, the CSID may swirl air in a desired direction, the swirling due to a shape of the CSID, as illustrated in a CSID 202 arranged in an air induction system 200 of FIGS. 2 and 3.

The air induction system 200 may be included in an engine, such as engine 10 of FIG. 1, and comprises an intake passage 204, which may, in one example, be the air intake passage 142 of FIG. 1. A set of reference axes 201 is provided, indicating a y-axis, an x-axis, and a z-axis. In FIG. 2, the intake passage 204 is tubular and hollow with a circular cross-section, taken along an x-y plane, and includes a first section 203 in FIG. 2 that is aligned relatively linear and a second section 205 that is curved. The first section 203 may taper to narrow along a direction towards the second section 205 and may couple at a narrow end 908 to a first end 206 of the CSID 202. The second section 205 of the intake passage 204 may include valves 208 to which other air passages may be attached (such as a low-pressure EGR passage, compressor recirculation passage, or other suitable passage). A second end 210 of the CSID 202 may couple to the second section 205 so that the CSID 202 is arranged between the first section 203 and the second section 205 and separates the first section 203 from the second section 205.

The CSID 202 is also tubular and hollow with an inner passage 211 extending through the CSID 202 from the first end 206 to the second end 210, as shown in FIG. 3 in an alternate view 300 of the air induction system. The CSID 202 has inwardly protruding threads 220, e.g., extending towards an inner passage 211 of the CSID 202, that wrap around the CSID 202 along a length 209 of the CSID 202. Details of the threads 220 are discussed further below with reference to FIGS. 4, 5, and 11. In FIG. 3, the CSID 202 is depicted without coupling to the first section 203 of the intake passage 204 to show an opening in the first end 206 of the CSID 202 that may also be an inlet of the CSID 202. The CSID 202 may have a similar opening at the second end 210 that may also be an outlet of the CSID 202. Elements in FIG. 3 and subsequent figures that are in common with FIG. 2 are similarly numbered. The CSID 202 has a generally cylindrical shape with a number of continuous, spiraling indentations in a side wall of the CSID extending between the first end 206 and the second end 210 and may not have a uniform inner (and outer) diameter. A first inner diameter 212, depicted in FIG. 2, at the first end 206 of the CSID 202 may be substantially equal to an outer diameter of the first section 203 of the intake passage 204, at the narrow end 908. The first end 206 of the CSID 202 is thus configured to slide over the narrow end 908 of the first section 203 and circumferentially surround the narrow end 908 of the first section 203. The first end 206 of the CSID 202 may also have a groove 214 to accommodate a hose clamp 216 that may secure attachment of the first end 206 of the CSID 202 to the first section 203 of the intake passage 204 by tightening the hose clamp 216.

A second inner diameter 218 of the second end 210 of the CSID 202 may be substantially equal to an outer diameter of a first end 903 of the second section 205 of the intake passage 204 that is proximate to the CSID 202. The second end 210 of the CSID 202 may slide over the first end 903 of the second section 205 of the intake passage 204 and circumferentially surround the first end 903 of the second section 205. The coupling of the second end 210 of the CSID 202 to the second section 205 of the intake passage 204 may be secured by pressure exerted around the first end 903 of the second section 205 by the second end 210 of the CSID 202 so that the CSID 202 is fixed in place by pressure and without any additional device. In this way, the CSID 202 may be readily detached for maintenance or replacement. Alternatively, the coupling may be fortified by adding a layer of adhesive between an inner surface of the second end 210 of the CSID 202 and an outer surface of the first end 903 of the second section 205 of the intake passage 204.

In one example, the first inner diameter 212 and the second inner diameter 218 may be equal, if the outer diameters of the narrow end 908 of the first section 203 and the first end 903 of the second section 205 of the intake passage 204 are equal. In other examples, the first inner diameter 212 and the second inner diameter 218 may be different. The first inner diameter 212 may be larger than the second inner diameter 218 or, alternatively, the first inner diameter 212 may be smaller than the second inner diameter 218.

By positioning the CSID 202 between and in line with the first section 203 and second section 205 of the intake passage 204, the CSID 202 may be configured as a convolute. Air flowing through the passage, in a direction indicated by arrow 302 in FIG. 3, may flow from the first section 203, through the CSID 202, through the second section 205 and into a compressor inlet without interruption. The CSID 202 may be formed from a durable, flexible material such as rubber which allows the CSID 202 to couple sections of the intake passage, even when the sections are not linearly aligned, by bending the CSID 202 to accommodate variations in relative positioning of the sections. The flexibility of the CSID 202 may also allow the CSID 202 to absorb a motion of the engine, herein referred to as engine roll, arising from torque generation at the engine.

During torque output, the engine may undergo several modes of vibration. In particular the engine may vibrate about a torque roll axis and the engine may be mounted and anchored to brace against the resulting engine roll. The vibrational motion of the engine may be transmitted to components coupled to the engine, such as the turbocharger compressor and passages delivering intake air to the compressor. While the mounting of the engine, as well as the compressor, may suppress undesirable movement and dislocation of the engine, air and gas passages through which the motion transmits may not be similarly braced. By including rubber ducts or couplers, such as the CSID 202, in the passages, engine roll may be absorbed by the rubber ducts, dampening the motion so that components coupled to the passages, positioned further from the engine, may not be affected or the motion may be greatly reduced.

An orientation of the CSID 202 may depend on an orientation of the engine to effectively absorb engine roll. A first schematic 700 of an engine system with a CSID 720 arranged in an intake passage 722 is shown in FIG. 7. In one example, the CSID 720 may be the CSID 194 of FIG. 1 or the CSID 202 of FIG. 2. The intake passage 722 extends between a compressor 740 and an air cleaner 750, the compressor 740 immediately upstream of an engine 730. The intake passage 722 curves so that a first portion 711 of the intake passage 722 coupled to the compressor 740 is parallel with the z-axis and continues to a second portion 713 of the intake passage 722 coupled to the CSID 720 that is parallel with the x-axis. The engine 730 has an engine roll axis 702 that is also parallel with a width 706 of the engine 730, a crankshaft 703 of the engine 730, the first section 711 of the intake passage 722, and the x-axis and perpendicular to the z-axis. With respect to the y-axis, however, (e.g., out of the page in FIG. 7), the engine roll axis 702 may be angled relative to the crankshaft 703 by 8-20 degrees.

To absorb vibration of the engine 730 about the engine roll axis 702, the CSID 720 may be oriented so that a central axis 708 of the CSID 720 is also parallel to the engine roll axis 702 along the z-axis. The CSID 720 may be angled to or coaxial with the engine roll axis 702 in the y-direction. In the engine system of FIG. 7, the CSID 720 is positioned in the second portion 713 of the intake passage 722 to maintain a coaxial alignment of the CSID 720 with the engine roll axis 702.

In a second schematic 800 of an engine system, shown in FIG. 8, an engine 830 is arranged perpendicular with respect to the engine 730 in FIG. 7 so that a width 806 of the engine 830 in FIG. 8 is wider than the width 706 of the engine 730 in FIG. 7. An intake passage 822 maintains a same orientation in FIG. 8 as the intake passage 722 of FIG. 7, extending between a compressor 840 immediately upstream of the engine 830, and an air cleaner 850. The intake passage 822 has a first portion 811 adjacent to the engine 830 that is parallel with the z-axis and a second portion 813, continuous with the first portion 811, that is parallel with the x-axis.

The first portion 811 of the intake passage 204 is fluidly coupled to the engine 730 via the compressor 840 so that an engine roll axis 802 and a crankshaft 803 are parallel with the first portion 811 along the z-axis and perpendicular to the second portion 813 of the intake passage 822. In this configuration, a CSID 820 is positioned in the first portion 811 of the intake passage 822 to arrange the CSID 820 in an orientation parallel with the engine roll axis 802. The CSID 820 may be, in some examples, the CSID 194 of FIG. 1 or the CSID 202 of FIG. 2. The CSID 820 may be angled relative to the engine roll axis 802 along the y-axis, or may be coaxial. As a result of the arrangement of the CSID 820 in the first portion 811 of the intake passage 822, the CSID 820 is closer to the compressor 840 (and engine 830) than the configuration of FIG. 7.

It will be appreciated that the orientations of the CSID 720 and 820 shown in FIGS. 7 and 8, respectively, are non-limiting examples of how a CSID may be arranged relative to the engine roll axis. Other examples of engine systems including the CSID may include orientations where the CSID is positioned perpendicular or angled with respect to the alignment of the engine roll axis as well as the engine. While orienting the CSID co-axial with the engine roll axis may provide maximum absorption of engine roll, packaging constraints may lead to the CSID being positioned in an alternative orientation that still dampens NVH issues in spite of the non-co-axial alignment.

The positioning of a CSID in an intake passage may define a termination point or region where engine roll is reduced below a threshold level and dampened to an extent that components further upstream of the CSID are not adversely affected by vibrations generated by the engine. For example, an engine system 900 shown in FIG. 9 includes the CSID 202 of FIGS. 2-5 and the intake passage 204 of FIGS. 2-3. The CSID 202 is arranged in the first section 203 of the intake passage 204, parallel and continuous with the first section 203, and coupled at the second end 210 of the CSID 202 to the first end 903 of the second section 205 of the intake passage 204. The second section 205 is coupled, at a second end 905, opposite the first end 903, to a compressor inlet 902 and may be secured to the engine via clamps or brackets or some other fastening mechanism. The first section 203 of the intake passage 204 may be coupled at the narrow end 908 to the CSID 202 and at an opposite end to a frame of the vehicle (not shown). As a result, the second section 205 may experience a different motion, e.g., amplitude and/or direction of oscillation or displacement, than the first section 203 of the intake passage 204.

For example, engine roll may be propagated through the second section 205 which may manifest as a high frequency vibration causing a relatively large displacement of the second section 205. Lower frequency vibrations may be transferred to the first section 203 of the intake passage 204, arising from a mounting of the first section 203 to the vehicle frame, which may also experience bursts of large amplitude displacements due to vehicle navigation over uneven terrain, such as speed bumps, potholes, etc. In examples where the intake passage 204 may be comprised of a single continuous section, the different motions experienced at opposite ends of the intake passage, resulting from engine roll at one end and vehicle motion at the other end, may force the intake passage 204 to twist aggressively and become degraded. By incorporating the CSID 202 in the intake passage 204 as a coupler between the first section 203 and the second section 205, different types of motion may be absorbed at the CSID 202, decreasing a transmission of motion to a section of the intake passage distal to a source of motion, e.g., transmission of engine roll to the first section 203 and transmission of vehicle motion to the second section 205. Thus a likelihood of degradation to the intake passage 204 is reduced.

Engine roll generated in the engine system 900 may be transmitted through the components enclosed within box 904, including a compressor 910, the second section 205 of the intake passage 204, and the second end 210 of the CSID 202. As the vibration propagates through the CSID 202, resulting in a twisting motion of the CSID 202 that is described further below with respect to FIG. 10, engine roll is dampened and absorbed by the CSID 202. As a result, components enclosed in box 906, including the first end 206 of the CSID 202 and the first section 203 of the intake passage 204, may experience less displacement due to engine roll.

An amount of the intake passage 204, e.g., a distance along a length of the intake passage 204, displaced by engine roll may be affected by where the CSID 202 is arranged relative to the engine system 900 and an inlet 902 of the compressor 910. For example, a closer positioning of the CSID 820 to the engine 830 in FIG. 8 than the CSID 720 to the engine 730 in FIG. 7 may allow the CSID placement shown in FIG. 8 to dampen engine vibrations closer to the source, e.g., the engine, thus reducing a distance along the intake passage from the engine towards a compressor inlet subjected to engine roll. As such, with respect to the engine system 900 of FIG. 9, it may be desirable to arrange the CSID 202 proximate to the compressor inlet 902, and further from an inlet of the intake passage 204, to suppress engine roll near the source of the motion. However, an alignment of the CSID parallel with the engine roll axis, as shown in FIGS. 7 and 8, regardless of distance from the compressor and engine, may be prioritized over proximity to maximize the dampening effect.

The transmission of engine roll to a CSID may cause the CSID to twist, bend, extend, or compress while absorbing the motion, as shown by a CSID 1000 in FIG. 10. The CSID 1000 may be a non-limiting example of the CSID 194 of FIG. 1. The CSID 1000 may have a first end 1002 and a second end 1004, each end configured to couple to a section of an intake passage. When absorbing engine roll the first end 1002 may rotate in a direction indicated by arrow 1006 while the second end 1004 may rotate in an opposite direction, indicated by arrow 1008. The direction indicated by arrow 1006 may correspond to a clockwise direction when viewing the CSID 1000 along the z-axis from the first end 1002 towards the second end 1004 and the direction indicated by arrow 1008 may correspond to a counter-clockwise direction. Alternatively, the first end 1002 may rotate in an counter-clockwise direction while the second end 1004 may rotate in a clockwise direction. The twisting, e.g., rotation of the ends in opposite directions, of the CSID 1000 may suppress a motion transmitted to the CSID 1000 from an engine.

The CSID 1000 may also compress so that a length 1012 of the CSID 1000 is decreased, as indicated by arrows 1010, or extend so that the length 1012 is increased, as indicated by arrow 1014 while absorbing engine roll. In addition, the CSID 1000 may bend during transmission of engine roll so that the CSID 1000 is not coaxial with a central axis 1016 of the CSID 1000, and instead be curved in at least one region along the length 1012 relative to the central axis 1016. The CSID 1000 may be adapted to undergo one or more of the motions described (e.g., twisting, bending, compressing, extending) when arranged in the intake passage of the engine system.

During particularly turbulent engine motion, a resulting engine roll transferred to a CSID may increase a likelihood of deformation of the CSID. If occurrences of more rigorous engine roll is anticipated, a geometry of the CSID may be modified to compensate for the increased motion. In one example, a length, such as a length 209 of the CSID 202 in FIGS. 4 and 1012 of the CSID 1000 in FIG. 10, of the CSID may be increased to enhance absorption of motion and reduce a twisting force imposed on the CSID by engine roll. In another example, a winding rate of convolutes, or threads, of the CSID may be increased to decrease a pitch of the threads, thereby increasing a density of the threads and resisting the twisting force. The configuration of the threads of the CSID and effect on engine roll absorbance and swirl generation is discussed in the following figure descriptions of FIGS. 4-6.

A CSID may be shaped to influence a rotational direction of air flowing through the intake passage. The CSID may have threads providing coiled paths, extending continuously from the first end to the second end of the CSID. For example, the CSID 202 of FIGS. 2, 3, and 9 is shown in FIG. 4 in a side view 400, without coupling of the CSID 202 to an intake passage for brevity. The CSID 202 may have threads 220 which may be curved projections, extending radially inwards towards a central axis 402 of the CSID 202. The threads 220 may be separated by rounded transitions 403, extending between each of the threads 220, providing smooth, curved and continuous transitional surfaces between the threads 220. The rounded transitions 403 may curve in an opposite direction from the curvature of the inwardly protruding (e.g., towards the central axis 402) threads 220. Each thread of the threads 220 may be evenly spaced apart from adjacent threads 220 and may curve in a spiral pattern around the central axis 402 while maintaining a uniform distance from the central axis 402, from the first end 206 to the second end 210 of the CSID 202. For example, a shape of a first thread 404 of the threads 220 is traced by arrows 406. The first thread 404 winds around the central axis 402 at least one full rotation around a circumference of the CSID 202 along the length 209 of the CSID 202. In other examples, however, the thread 404 may coil around the CSID 202 by less or more than one full rotation or wind around the CSID 202 along a portion of the length 209 of the CSID 202 instead of the full length 209. For example, the threads 220 may extend from the first end 206 of the CSID 202 to a mid-point along the length 209 or extend along a central portion of the length 209 of the CSID 202 but not reach the first end 206 or the second end 210.

An overall shape of the first thread 404 may be similar to a helix 1100, as shown in FIG. 11. The helix 1100 maintains a uniform distance from a central axis 1102 of the helix 1100 while extending along the z-axis. Returning to FIG. 4, the winding of the first thread 404 around the central axis 402, when viewed along the central axis 402 from the first end 206 to the second end 210 of the CSID 202, follows a clockwise direction. All the threads 220 of the CSID 202 may have a similar helical geometry, e.g., similar to the helix 1100 of FIG. 11, rotating around the CSID 202 uniformly in the clockwise direction. However, in other examples, the threads 220 may spiral in an opposite, counter-clockwise direction. Furthermore, the threads 220 may not maintain a uniform radius from the central axis 402 and instead have a larger radius in a mid-region of the CSID 202 (relative to the length 209) compared to regions along the length 209 proximate to the first end 206 and the second end 210. In other words, an overall height 408 of the CSID 202 may taper and become smaller at the first end 206 and the second end 210.

The rotational direction of the helical threads 220 may control a direction of swirl in air flow. As air enters the CSID 202 at the first end 206 as indicated by the arrow 302, contact and friction between the boundary layers of the flow and the threads 220 protruding into the CSID 202 redirects the air to channel flow along the threads 220. Thus, if the threads 220 spiral in the clockwise direction, from the first end 206 to the second end 210, the air may also rotate in the clockwise direction. Similarly, if the threads 220 spiral in the counter-clockwise direction, the air may be swirled in the counter-clockwise direction. A direction of spiraling of the threads 220 may be selected based on a rotational direction of a compressor, e.g., the compressor 910 of FIG. 9, arranged downstream of the CSID 202.

Figure 5:
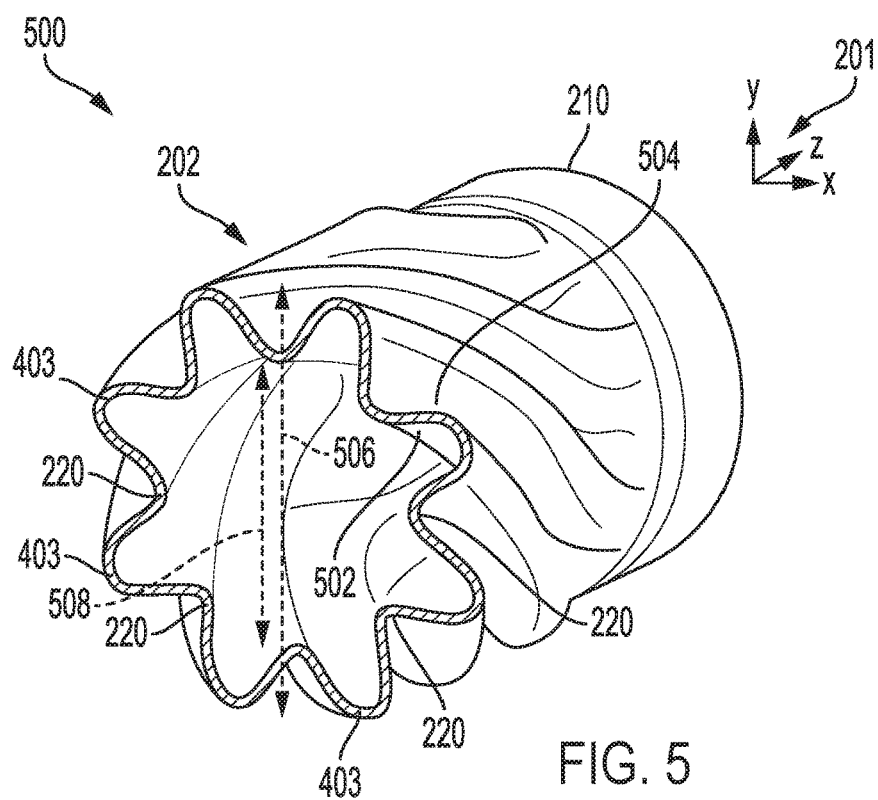
FIG. 5 shows a cross-section of the CSID.

An interior of the CSID 202 may be shaped to reflect an outer geometry of the CSID 202, as shown in a cross-section 500 of FIG. 5, taken along line 5-5' of FIG. 4. In other words, a thickness of a material of the CSID 202, defined as a distance between an inner surface 502 and an outer surface 504 of the CSID 202, may be uniform and variations in a shape of the material are similarly represented in both the outer surface 504 and the inner surface 502. As such, the inner surface 502 closely matches curves and bends of the outer surface 504 of the CSID 202. It will be appreciated, that the cross-section 500 of FIG. 5 and the CSID 202 of FIGS. 2-4 is a non-limiting example of the CSID. While the CSID 202 is shown with eight of the threads 220, other embodiments may have more or less of the threads 220, or the threads 220 may each spiral around the circumference of the CSID 202 through more or less than one full rotation, the thickness of the CSID 202 may be thinner or thicker than the thickness shown, or the thickness may be non-uniform. In addition, other examples may include threads that have various inwardly protruding shapes other than curving, such as rectangular or pointed. Similarly the transitions 403 between the threads 220 may be other geometries, such as pointed, rectangular, etc., rather than curved.

In some example, an outer diameter 506 of a body 420, as shown in FIG. 4 and defined as the portion of the length 209 of the CSID 202 between the first end 206 and the second end 210, the outer diameter 506 measured across the transitions 403 of the outer surface 504 of the CSID 202, may be larger than the outer diameters of the narrow end 908 of the first section 203 of the intake passage 204 and of the first end 903 of the second section 205 of the intake passage 204, as shown in FIG. 9. The outer diameter 506 of the body 420 of the CSID 202 may be equal to, as shown in FIG. 10, or larger, as shown in FIGS. 2-3, than the outer diameters of the first end 206 and the second end 210 of the CSID 202. Furthermore, an inner diameter 508 of the CSID 202, as shown in FIG. 5, in the body of the CSID 202 may be smaller than, larger than, or equal to the inner diameters of the first end 206 and the second end 210.

The inner surface 502 of the CSID 202 may interact with air flowing through the intake passage and through the CSID 202 so that air flow is swirled according to the rotational direction that the threads 220 spiral. Swirl is a twisting, spiraling motion of air that forms a vortex, and a magnitude of swirl may be defined by a swirl ratio which is a ratio of an axial flux of angular momentum to an axial flux of an axial momentum of the air flow. In other words, the swirl ratio may be a measure of the angular momentum in the air relative to the axial momentum of the air. The swirl may be measured immediately upstream of the compressor inlet. The larger the swirl ratio, the greater the amount of air mass and also the stronger a pressure fall at a center of the vortex. Calculation of the swirl ratio in the CSID 202 may include simplifying the shape of the CSID 202 to a cylinder 602, as shown in a schematic diagram 600 in FIG. 6.

Figure 6:
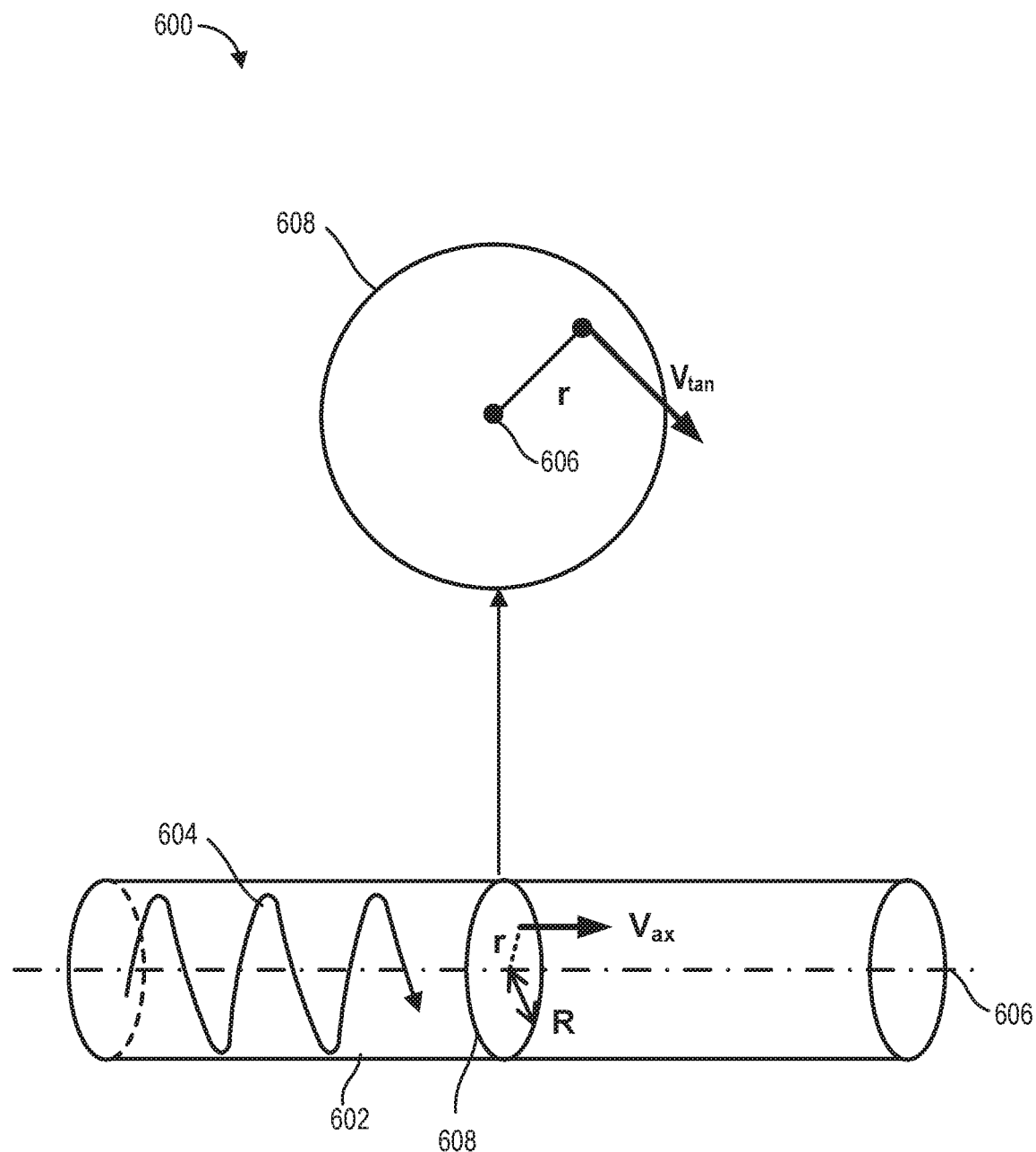
FIG. 6 shows a schematic diagram illustrating parameters used to determine swirl ratio and mean pre-whirl ratio.

A spiraling motion of air flow through the cylinder 602, illustrated in FIG. 6, is indicated by arrow 604, the spiral centered about a central axis 606 of the cylinder 602. The swirl ratio may be determined from a circular cross-section 608 of the cylinder 602, taken in a plane perpendicular to the central axis 606. The cylinder 602 has a radius R and the air flow has an axial velocity, $V_{ax}$. A radial position in the circle is defined by r, and a tangential velocity $V_{tan}$, tangent to radial position r. The swirl ratio may be calculated according to $$\text{Swirl} = \frac{\int_S \rho V_{ax} V_{tan} r dS}{R \int_S \rho V_{ax}^2 dS} \quad (1)$$

where
  S=surface area of the circle 608
  ρ=density of air
  $V_{ax}$=axial velocity of air
  $V_{tan}$=tangential velocity of air
  r=radial distance from a center of cross-section 608
  R=hydraulic radius of cross-section 608

Based on equation 1, the swirl ratio may depend mainly on the velocity components of the air and the hydraulic radius, R of the cross-section 608. For example, if R is decreased the swirl ratio increases. By adapting a CSID with spiraling threads protruding inwards towards a central axis, the threads impart the tangential velocity to the intake air, thereby inducing swirl in a direction according to a direction of the spiraling of the threads. An inner radius of the CSID defined by inward protrusion of the threads, e.g., the inner diameter 508 of FIG. 5, may decrease inside the CSID relative to an inner diameter of an upstream portion of an intake passage, thus forcing the air to interact with the threads and increasing the swirl ratio of air flow in the CSID.

The threads of the CSID may also interact with air flow to increase a speed of the flow. For example, flow through a portion of the intake passage upstream of the CSID, such as the first section 203 of the intake passage 204 of FIGS. 2-4, may be 43 m/s and increase to 70 m/s upon passing through the CSID 202. A flow rate through the CSID may be further increased by increasing the inner diameter of the body of the CSID and/or increasing the length of the CSID. Adjusting various geometric aspects, such as a pitch, a depth, the length, and a bend angle of the CSID may result in generation of desirable swirl for the air flow in addition to favorable resistance to engine roll. For example, increasing the length may also increase a resistance of the CSID to twisting, bending, compressing, and extending forces due to engine roll.

As an example, changing a pitch of the spiraling threads may affect a transition in air flow from linear flow to swirl flow. A pitch 410, as shown in FIG. 4, is a distance from a center of a thread, e.g., the first thread 404, to a center of an adjacent thread, e.g., a second thread 405. The pitch 410 may be set to allow each thread one full rotation around the circumference of the CSID 202 along the length 209 of the CSID 202. As an example, the length 209 of the CSID 202 may be 30 cm while the pitch 410 may be 5 cm. However, if the pitch is decreased to, for example, 3 cm, while maintaining a length 209 of 30 cm, the threads 220 may be more closely spaced together and wind around the CSID 202 more than one full rotation. If the pitch 410 is increased to, for example, 7 cm, while maintaining a length 209 of 30 cm, the threads 220 may be further spaced apart and wind around the CSID 202 less than one full rotation.

Decreasing or increasing the pitch 410 may alter the amount of swirl imparted to the air flow. By decreasing the pitch 410, the air may be channeled by more densely arranged threads 220 along the length 209 of the CSID 202 while travelling through the CSID 202, resulting in more rapid swirling. Conversely, when the pitch 410 is increased, the air may contact more threads 220 that are more distantly spaced apart and swirl more slowly. Furthermore, while the pitch 410 is shown to be uniform between the threads 220 in FIG. 4, the pitch 410 may be adjusted to be non-uniform along the length 209 of the CSID 202. For example, the pitch 410 may be increased proximate to the first end 206 of the CSID 202 where air enters the CSID 202 and decrease towards the second end 210 of the CSID 202 to transition air flow to rotational movement more gradually.

In addition, decreasing the pitch 410 increases the number of rotations that the threads 220 wrap around the circumference of the CSID 202 for a given length 209 of the CSID 202. More turns of the threads 220 around the CSID 202 provides the CSID 202 with greater resistance to movement translated to the CSID 202 from engine roll due to a structural reinforcement of the CSID 202 frame by the threads 220. Thus, a high tolerance of the CSID 202 to deformation may be provided by increasing the length 209 of the CSID 202 and decreasing the pitch 410.

Involuntary changes to the pitch 410 may occur during changes in engine movement that cause the CSID 202 be compressed or extended. When the CSID 202 is compressed, the pitch 410 may be decreased, simultaneously decreasing the length 209 and increasing swirl generation in the intake air. Conversely, when the CSID 202 is extended, the pitch 410 and the length 209 may be increased, decreasing an amount of swirl imposed on the air flow. Thus in spite of adjustments to the geometry of the CSID 202 to achieve a desired swirl effect, variations in swirl generation may be observed in real-time during engine operation.

In addition to adjustment of the pitch 410, modification of a depth 412, as shown in FIGS. 4 and 5, of the threads 220 may adjust movement of air through the CSID 202. The depth 412 is a distance between a point on the first thread 404 (or any of the threads 220) projecting furthest away from the central axis 402 and a point on the thread 404 projecting inwards closest to the central axis 402. The depth 412 may be defined as half of a difference between the outer diameter 506 and the inner diameter 508 of the CSID 202. An amount of material of the threads 220 in contact with the flow of air may be determined by the depth 412 thereby affecting how much the air is swirled. As an example, if the outer diameter of the CSID 202 (e.g., the outer diameter 506 of FIG. 5) is 12 cm, the depth 412 may be set at 1.5 cm. By increasing the depth 412 to 2 cm, a rotational speed of air flow may be increased by 20%, for example. However, increasing the depth 412 may also narrow an inner diameter (e.g., the inner diameter 508 of FIG. 5) of the CSID 202 and restrict an axial flow rate of air through the CSID 202. The restriction imposed by increasing the depth 412 may be offset by increasing the outer diameter of the CSID 202, by increasing the length 209 of the CSID 202, or by a combination of increasing both the outer diameter and the length.

For example, if the CSID 202 is positioned in a region of the intake passage that does not allow for a longer CSID to fit but more swirl of the intake air is desired, the depth 412 of the threads 220 may be increased and the pitch 410 decreased while the outer diameter of the CSID 202 may be widened. As another example, if more swirl of the air flow with a less disruptive transition from linear to rotational flow is desired and the packaging space for the intake passage does not allow for the CSID 202 to be widened, the pitch 410 may be adjusted to gradually decrease across the length 209 of the CSID 202, the depth 412 increased, and the length 209 also increased.

In another example, if packaging constraints and engine orientation result in the CSID 202 being positioned relatively far from the compressor inlet, the swirl generated by the CSID 202 in the intake air may lose momentum by the time the air reaches the compressor inlet reducing an effectively of the CSID 202. As such, the pitch 410 may be increased accordingly to offset the loss of momentum due to distance from the compressor.

Furthermore, a bend angle of the CSID may be adjusted to increase induced swirl. Another non-limiting example of a CSID is depicted by a CSID 1200 in FIG. 12. The CSID 1200 may be aligned relative to a first, linear, central axis 1202, similar to the central axis 402 of the CSID 202 of FIG. 4, so that the CSID 1200 is bent, e.g., a central portion of the CSID 1200 is curved to be above the central axis 1202, relative to the y-axis. In other words, the CSID 1200 may have a curved central axis, as indicated by a second central axis 1204 in FIG. 12. An angle ϕ formed by an upwardly curving portion of the CSID 1200, with respect to the first central axis 1202, may be a bend angle ϕ. Modifying the bend angle ϕ may adjust the interaction of air flow with inner surfaces of threads 1208 of the CSID 1200, thereby affecting swirl generation. For example, increasing the bend angle ϕ, e.g., increasing a curvature of the second central axis 1204, may increase contact between the air and the threads 1208, inducing more swirl. Decreasing the bend angle ϕ may, in turn, decrease contact and reduce swirl. Depending on a desired amount of interaction between the CSID 1200 and intake air, the CSID 1200 may be arranged in the intake passage so that the CSID 1200 is maintained in a position with a particular curvature corresponding to a specific bend angle ϕ.

In yet another example, a geometry of a CSID 1300 may be divided to achieve absorption of vibrations and swirl generation in individual portions of the CSID 1300, as shown in FIG. 13. The CSID 1300 has a central axis 1302 and a length 1304 defined along the z-axis. The CSID 1300 has a first portion 1306 that extends from a first end 1308 of the CSID 1300 to a mid-point 1310 along the length 1304 of the CSID 1300. A second portion 1312 of the CSID 1300 extends from the mid-point 1310 to a second end 1314 of the CSID 1300.

Air flow through the CSID 1300 is indicated by arrow 1316 and as such, the first portion 1306 is arranged upstream of the second portion 1312 of the CSID 1300. The first portion 1306 may be configured to absorb engine roll but not to swirl air flow. The first portion 1306 includes a groove 1320 at the first end 1308 of the CSID 1300 configured to receive a hose clamp to secure the CSID 1300 to an intake passage. The first portion 1306 also has a first set of threads 1318 downstream of the groove 1320 protruding inwards towards the central axis 1302 that, unlike the threads 220 of the CSID 202 of FIGS. 2-5 and 9, do not spiral along the length 1304 of the CSID 1300. Instead, each thread of the first set of threads 1318 is parallel with the y-axis, forming a continuous ring around the CSID 1300.

The first set of threads 1318 may be similar to bellows, allow bending, compression, and extension of the first portion 1306 of the CSID 1300 and may extend along the central axis 1302 between the groove 1320 and the mid-point 1310 of the CSID 1300. An outer diameter 1322 of the first set of threads 1318 may be greater than a diameter 1324 of the CSID 1300 at the first and second ends 1308, 1314. Each thread of the first set of threads 1318 may protrude towards the central axis 1302 with a sharper shape, e.g., more pointed, than, for example, the threads 220 of the CSID 202 of FIGS. 2-5 and 9. Transitions 326 between each of the first set of threads 1318, protruding away from the central axis 1302, may be similarly more pointed in shape than the rounded transitions 403 of the CSID 202.

By positioning the first portion 1306 of the CSID 1300 at an upstream portion of the CSID 1300, the first portion 1306 may be directly coupled to a first section of the intake passage that is attached to a vehicle frame, resulting in dampening of oscillations transmitted through the first section of the intake passage and generating during vehicle motion. The first portion 1306 may also absorb engine roll, transmitted through a second section of the intake passage extending between a compressor inlet and the second end 1314 of the CSID 1300. The non-helical first set of threads 1318 may have a higher degree of flexibility than spiraling threads due to the geometry of the first set of threads 1318, allowing the CSID 1300 to contort more readily. By configuring a portion of the CSID 1300 with the first set of threads 1318, each thread parallel with the y-axis, the CSID 1300 may also accommodate misalignment of the first and second section of the intake passage more easily.

The second portion 1312 of the CSID 1300 may have a narrower outer diameter 1327 than either the outer diameter 1322 of the first portion 1306 or the diameter 1324 of the first and second ends 1308, 1314 of the CSID 1300. The second portion 1312 of the CSID 1300 has a second set of threads 1328 that have a spiraling, helical geometry, similar to the threads 220 of the CSID 202 of FIGS. 2-5 and 9. The second set of threads 1328 swirl in a clockwise direction when the CSID 1300 is viewed along the central axis 1302 from the first end 1308 to the second end 1314, the second set of threads 1328 extending from the mid-point 1310 to the second end 1314. Each thread of the second set of threads 1328 may rotate around less than a full circumference of the CSID 1300. For example, each thread may rotate 90 degrees or 120 degrees or some angle less than 360 degrees.

Each thread of the second set of threads 1328 may curve inwards towards the central axis 1302 and be spaced away from adjacent threads by rounded transitions 1330, curving away from the central axis 1302. A wall 1332 of the CSID 1300, e.g., a wall extending between the first end 1308 and the second end 1314 and forming the first and second portions 1306, 1312 of the CSID 1300, may transition from the first portion 1306 to the second portion 1312 at the mid-point 1310 smoothly, seamlessly, and continuously. The smooth transition at the mid-point 1310 does not introduce additional friction between air flow and inner surfaces of the CSID 1300, allowing the flow velocity to increase as an inner diameter 1334 of the second portion 1312 decreases relative to an inner diameter 1336, which may manifest as an increase in tangential velocity as the second set of threads 1328 compels the air to rotate.

By positioning the second portion 1312, configured to impart swirl to air flow, downstream of the first portion 1306, rotation of the air is not adversely affected by travel through non-spiraling threads after swirl is generated. For example, if the first portion 1306 and the second portion 1312 were positioned oppositely with swirl induced upstream of absorption of vibrations, friction generated between the swirling air and the more pointed first set of threads 1318, aligned perpendicular to axial flow through the CSID 1300, may reduce flow rates and decrease the tangential velocity of the rotating air.

It will be appreciated that the CSID 1300 is a non-limiting example of a divided CSID and numerous variations in the configuration of the CSID 1300 are possible without departing from the scope of the present disclosure. As an example, in FIG. 13, the first portion 1306 of the CSID 1300 is depicted as a larger portion of the CSID 1300 than the second portion 1312. For example, the first portion 1306 may form 60% of the length 1304 of the CSID 1300 while the second portion 1312 may form 40% of the length 1304. In other examples, however, the first portion 1306 may form a larger portion, such as 65% or 70% of the length 1304 or the first portion 1306 may constitute a smaller fraction of the length 1304 than the second portion 1312. The first and second portions 1306, 1312 may each have more or less threads than shown of the first set of threads 1318 and the second set of threads 1328. A pitch and a depth of the first set and the second set of threads 1318 and 1328 may be smaller or larger than depicted and diameters of the first and second portions 1306, 1312 may differ relative to one another.

A CSID may be adapted to a particular engine configuration, e.g., compressor size, length of intake passage, etc., by adjusting a geometry of the CSID. For example, the CSID 1000 of FIG. 10 may have a length that is equal to the CSID 202 of FIGS. 2-5. The CSID 1000, however, may have threads that coil around the circumference of the CSID 1000 through one and a half rotations while the CSID 202 may have threads that coil around the circumference of the CSID 202 exactly once. The CSID 1000 may have a smaller pitch relative to the CSID 202 and, as a result, may generate a higher degree of swirl in the intake air flowing through. Thus, the CSID 1000 may be used in an intake passage coupled to a larger compressor with a larger impeller than the CSID 202 or the CSID 1000 may be positioned further away from a compressor than the CSID 202 while providing a same amount of swirl as the CSID 202.

In this way, a convolute-swirl integrated duct (CSID) may both absorb engine roll and introduce swirl to intake air before the air is delivered to a compressor arranged upstream of an engine. By pre-whirling the air, compressor stability and efficiency is improved while NVH issues are reduced. Formation of the CSID from a flexible material and positioning of the CSID in line in an intake passage so that the CSID is proximate to the compressor allows the CSID to replace a conventional convolute to absorb engine vibration. Unlike the conventional convolute, the CSID also spins air in a direction to match a rotation of the compressor without restricting flow rate into the compressor in addition to dampening NVH issues arising from engine-induced oscillations. Combining the motion-buffering effect of the convolute with swirl-inducing elements in a single component may decrease manufacturing costs while positioning the CSID along the intake passage allows the CSID to be readily accessible for maintenance and inspection. Adjustments to a diameter, length, pitch and depth of threads of the CSID allows the axial and radial velocity of the intake air to be varied to achieve a desired amount of swirl and linear flow rate of the air prior to engagement with the compressor impeller. Thus generating pre-whirl in intake air may be achieved by a device configured to absorb engine roll without adding more components to the engine. The technical effect of configuring an engine system with the CSID is that compressor performance is improved while engine vibrations are absorbed and dampened by a single device.

In one embodiment, a flexible conduit in a vehicle includes a first end and a second end, the second end downstream of the first end, each of the first and the second ends configured to couple to sections of an intake passage of an engine of the vehicle, and a plurality of threads spiraling around a circumference of the conduit and extending partially from the first end to the second end. In a first example of the flexible conduit, each thread of the plurality of threads has a helical shape and extends continuously along a length of the conduit from the first end to the second end and each thread of the plurality of threads is evenly spaced apart from adjacent threads on either side of each thread. A second example of the flexible conduit optionally includes the first example, and further includes wherein the plurality of threads includes a first portion with a first geometry that extends from the first end to a mid-point between the first end and the second end and a second portion with a second geometry that extends from the mid-point to the second end. A third example of the flexible conduit optionally includes one or more of the first and second examples, and further includes, wherein the plurality of threads protrude inwards, towards a central axis of the conduit, to contact air flowing through an inner passage of the conduit and the inward protrusion of the plurality of threads define flow paths for the air. A fourth example of the flexible conduit optionally includes one or more of the first through third examples, and further includes, wherein the plurality of threads are curved protrusions extending inwards, towards the central axis of the conduit, the curved protrusions separated by rounded transitions that are curved surfaces curving away from the central axis. A fifth example of the flexible conduit optionally includes one or more of the first through fourth examples, and further includes, wherein the plurality of threads are rectangular protrusions extending inwards towards the central axis of the conduit and separated by square transitions protruding away from the central axis. A sixth example of the flexible conduit optionally includes one or more of the first through fifth examples, and further includes, wherein the plurality of threads are sharp, angular protrusions extending inwards towards the central axis of the conduit and separated by sharp, angular transitions protruding away from the central axis. A seventh example of the flexible conduit optionally includes one or more of the first through sixth examples, and further includes, wherein a central axis of the conduit is linear between the first end and the second of the conduit. An eighth example of the flexible conduit optionally includes one or more of the first through seventh examples, and further includes, wherein a central axis of the conduit is curved between the first end and the second end of the conduit.

In another embodiment, an engine system includes a compressor coupled to the engine, positioned upstream of the engine in an intake passage coupled to an inlet of the compressor, and a tubular and flexible conduit arranged in the intake passage, upstream of the compressor, having a plurality of threads disposed in a side wall of the conduit, the plurality of threads wrapping around a circumference of the conduit. In a first example of the system, the conduit is arranged in the intake passage parallel with a roll axis of the engine. A second example of the system optionally includes the first example, and further includes, wherein the plurality of threads of the conduit have a helical geometry and extend continuously along a portion of a length of the conduit. A third example of the system optionally includes one or more of the first and second examples, and further includes wherein the plurality of threads spiral in a direction from an upstream end to a downstream end of the conduit in a same direction as a compressor is configured to rotate. A fourth example of the system optionally includes one or more of the first through third examples, and further includes, wherein the helical geometry of the plurality of threads allows the conduit to twist when engine from the engine is transmitted to the conduit through the intake passage. A fifth example of the system optionally includes one or more of the first through fourth examples, and further includes, wherein the twist of the conduit comprises a rotation of a first end of the conduit in a first direction and a rotation of a second end of the conduit in a second direction, the second direction opposite of the first direction. A sixth example of the system optionally includes one or more of the first through fifth examples, and further includes, wherein the plurality of threads wrap around the circumference of the conduit at least one full rotation around the conduit. A seventh example of the system optionally includes one or more of the first through sixth examples, and further includes, wherein the plurality of threads protrude into an inner passage of the conduit and into a pathway of air flow and wherein the plurality of threads define flow channels for the air flow.

In another embodiment, a device includes a coupler with helical-shaped threads wrapping around a circumference of the coupler and coupled to an intake passage at a first end and to the compressor inlet at a second end, the first end opposite of the second end. In a first example of the device, the intake passage at the first end of the coupler is connected to an object that is more fixed and less mobile than the coupler and the compressor inlet is also more fixed and less mobile than the coupler. A second example of the device optionally includes the first example, and further includes, wherein during vehicle operation, the coupler is configured to bend and/or twist to provide compliance to absorb positional variation between the coupler and the more fixed object connected to the intake passage and between the coupler and the compressor inlet.

In another representation, a system for a vehicle includes a first conduit positioned upstream of a first compressor and coupled to the first compressor by a first intake passage, configured with helical threads wrapping around a circumference of the first conduit, the helical threads having a first pitch, the first pitch defining a distance between each of the helical threads, and a second conduit positioned upstream of a second compressor and coupled to the second compressor by a second intake passage, also configured with helical threads wrapping around a circumference of the second conduit, the helical threads having a second pitch that is larger than the first pitch of the first conduit. In a first example of the system, the first compressor coupled to the first conduit is adapted with a larger impeller than the second compressor coupled to the second conduit. A second example of the system optionally includes the first example, and further includes wherein a first length of the first intake passage from the first conduit to the first compressor is longer than a second length of the second intake passage from the second conduit to the second compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine having a roll axis; and
a flexible conduit in a vehicle, comprising:
a first end and a second end, the second end downstream of the first end, each of the first and second ends configured to couple to sections of an intake passage of the engine of the vehicle; and
a plurality of threads spiraling around a circumference of the conduit and extending partially from the first end to the second end,
wherein the flexible conduit, including the plurality of threads, is oriented co-axial with the engine roll axis, the engine roll axis being a torque roll axis.

2. The system of claim 1, wherein each thread of the plurality of threads has a helical shape and extends continuously along a length of the conduit from the first end to the second end and each thread of the plurality of threads is evenly spaced apart from adjacent threads on either side of each thread.

3. The system of claim 1, wherein the plurality of threads includes a first portion with a first geometry that extends from the first end to a mid-point between the first end and the second end and a second portion with a second geometry that extends from the mid-point to the second end.

4. The system of claim 1, wherein the plurality of threads protrudes inwards, towards a central axis of the conduit, to contact air flowing through an inner passage of the conduit and an inward protrusion of the plurality of threads defines flow paths for the air.

5. The system of claim 4, wherein the plurality of threads are curved protrusions extending inwards, towards the central axis of the conduit, the curved protrusions separated by rounded transitions that are curved surfaces curving away from the central axis.

6. The system of claim 4, wherein the plurality of threads are rectangular protrusions extending inwards towards the central axis of the conduit and separated by square transitions protruding away from the central axis.

7. The system of claim 4, wherein the plurality of threads are sharp, angular protrusions extending inwards towards the central axis of the conduit and separated by sharp, angular transitions protruding away from the central axis.

8. The system of claim 1, wherein a central axis of the conduit is linear between the first end and the second of the conduit.

9. The system of claim 1, wherein a central axis of the conduit is curved between the first end and the second end of the conduit.

10. An engine system, comprising;
an engine having a roll axis;
a compressor coupled to the engine, positioned upstream of the engine in an intake passage coupled to an inlet of the compressor; and
a tubular and flexible conduit arranged in the intake passage, upstream of the compressor, having a plurality of threads disposed in a side wall of the conduit, the plurality of threads wrapping around a circumference of the conduit, wherein the conduit, including the plurality of threads, is oriented co-axial with the engine roll axis, the engine roll axis being a torque roll axis.

11. The engine system of claim 10, wherein the conduit is arranged in the intake passage parallel with the roll axis of the engine.

12. The engine system of claim 10, wherein the plurality of threads of the conduit has a helical geometry and extends continuously along a portion of a length of the conduit.

13. The engine system of claim 12, wherein the plurality of threads spirals in a direction from an upstream end to a downstream end of the conduit in a same direction as a compressor is configured to rotate.

14. The engine system of claim 12, wherein the helical geometry of the plurality of threads allows the conduit to twist when engine from the engine is transmitted to the conduit through the intake passage.

15. The engine system of claim 14, wherein the twist of the conduit comprises a rotation of a first end of the conduit in a first direction and a rotation of a second end of the conduit in a second direction, the second direction opposite of the first direction.

16. The engine system of claim 10, wherein the plurality of threads wraps around the circumference of the conduit at least one full rotation around the conduit.

17. The engine system of claim 10, wherein the plurality of threads protrudes into an inner passage of the conduit and into a pathway of air flow, and wherein the plurality of threads defines flow channels for the air flow.

18. A system, comprising:
an engine having a roll axis; and
a device for a compressor inlet of the engine, comprising:
a coupler with helical-shaped threads wrapping around a circumference of the coupler and coupled to an intake passage at a first end and to the compressor inlet at a second end, the first end opposite of the second end, wherein the coupler, including the helical-shaped threads, is oriented co-axial with the engine roll axis, the engine roll axis being a torque roll axis.

19. The system of claim 18, wherein the intake passage at the first end of the coupler is connected to an object that is more fixed and less mobile than the coupler and the compressor inlet is also more fixed and less mobile than the coupler.

20. The system of claim 19, wherein during vehicle operation, the coupler is configured to bend and/or twist to provide compliance to absorb positional variation between the coupler and the more fixed object connected to the intake passage and between the coupler and the compressor inlet.

* * * * *